(12) United States Patent
Hotti et al.

(10) Patent No.: US 7,139,775 B2
(45) Date of Patent: Nov. 21, 2006

(54) METHOD AND ARRANGEMENT FOR PROVIDING AN AUDIT OF A REPLICA DATABASE

(75) Inventors: Timo Hotti, Cupertino, CA (US); Jarmo Parkkinen, Helsinki (FI)

(73) Assignee: Solid Information Technology OY, Helsinki (FI)

( * ) Notice: Subject to any disclaimer, the term of this patent is extended or adjusted under 35 U.S.C. 154(b) by 595 days.

(21) Appl. No.: 09/985,028

(22) Filed: Nov. 1, 2001

(65) Prior Publication Data

US 2003/0084073 A1  May 1, 2003

(51) Int. Cl.
*G06F 17/00* (2006.01)
(52) U.S. Cl. .................. 707/104.1; 707/101; 707/102; 707/103 R
(58) Field of Classification Search ................ 707/100, 707/102, 104.1; 705/40; 709/206; 713/168
See application file for complete search history.

(56) References Cited

U.S. PATENT DOCUMENTS

| | | | |
|---|---|---|---|
| 5,758,150 A | 5/1998 | Bell et al. | |
| 5,982,890 A | 11/1999 | Akatsu | |
| 6,275,824 B1 | 8/2001 | O'Flaherty et al. | |
| 6,684,333 B1 * | 1/2004 | Walker et al. | 713/168 |
| 6,745,229 B1 * | 6/2004 | Gobin et al. | 709/206 |
| 6,782,379 B1 * | 8/2004 | Lee | 707/2 |
| 6,816,871 B1 * | 11/2004 | Lee | 707/104.1 |
| 2002/0169745 A1 | 11/2002 | Hotti et al. | |

FOREIGN PATENT DOCUMENTS

EP   0 860 788 A2   8/1998

* cited by examiner

*Primary Examiner*—Sana Al-Hashemi
(74) *Attorney, Agent, or Firm*—Young & Thompson

(57) ABSTRACT

The invention is in the area of distributed system and database security. The invention relates to a method and an arrangement for increasing the level of trust between a master and a replica database by allowing the master database to perform an "unpredictable" audit of the replica database whenever deemed appropriate by the master database. The master database may for example define and generate an audit application and send it to at least one replica database using push synchronization and force the replica database to perform the audit application. The master database may also prepare expected results of the audit of the replica database and store them for later verification. After auditing the replica database may synchronize the results of the audit back to the master database for verification. The information flow between the master and replica databases is advantageously encrypted in a secure manner.

35 Claims, 5 Drawing Sheets

METHOD AND ARRANGEMENT FOR PROVIDING AN AUDIT OF A REPLICA DATABASE

TECHNICAL FIELD OF THE INVENTION

The invention relates to a method and an arrangement for increasing the level of trust between a master and a replica database. Especially the invention relates to performing an audit of the replica database.

BACKGROUND OF THE INVENTION

The following notions are used in this application:

"Data management system" is an entity, which comprises one or more databases and/or data management systems, whereby the system is responsible for reading the data structures contained in the databases and/or data management systems and for changing these data structures.

"Data element" is an information structure, which can comprise other data elements or such data elements, which can be construed as atomary data elements. For instance, in a relational database data elements are represented by tables comprising rows. The rows comprise columns, which are typically atomary data elements.

"Database" is an information structure, which comprises one or more data elements, and the use of which is controlled by the data management system. The invention is applicable both in relational databases and in databases of other forms, such as in object oriented databases.

"Database Server" is a software process that manages the data of a database and through which applications can access and modify the data of the database.

"Database operation" is an event, during which data elements are read from the database, during which data elements of the database are modified, during which data elements are removed from the database, or during which data elements are added to the database.

"Database Catalogue" is a logical database within a database instance. A physical database can manage data of multiple database catalogues. Each database catalogue can act as a master or replica database node in a database synchronization environment.

"Database Schema" is the structure of a logical database, described in a formal language supported by the database management system (DBMS). In a relational database, the schema defines the tables, the columns in each table, and the relationships between columns and tables.

"Master database" is a logical database in a database synchronization system that contains the official version of synchronized/distributed data, such as for example data about significant financial transactions. The master database can have multiple replica databases in the network.

"Replica database" is a logical database in a database synchronization system that contains a full or partial copy of the master data.

"Synchronization" is the operation between replica and master database catalogues in which changed data is exchanged between the catalogues. In one known embodiment, this means propagation of Intelligent Transactions from replica to master and subscribing to at least one publication to download changed data from master to replica, [1].

"Push synchronization" is synchronization between replica and master database catalogues initiated by the master database server.

"Publication" is a set of data in a database catalogue that has been published in master database for synchronization to one or multiple replica databases. A publication can contain parameters that are used to filter data of the publication.

"Transaction" is a plurality of database operations acting on the data pieces or elements. A transaction is an atomic operation that is completed or discarded as a whole. A transaction can also comprise further transactions. A transaction may be for example a financial transaction.

There are presently many different ways for auditing or verifying health of a database. One of the typical ways to audit the databases is to use a separated application that analyses the consistency of the database. According to prior art solutions audit information for database updates and the status of transactions in process is often sequentially written in audit records in an audit file. The audit file is typically used to restore the database to a consistent state following a system failure.

These audit files can also be used for verifying that the content of a database matches with the combined effect of transactions that have been committed in that database. A mismatch between these two may indicate a security breach, technical malfunction, error in application program or user error.

There is disclosed a prior art solution in U.S. Pat. No. 6,275,824 [4] which features an audit module that may validate the enforcement of the data privacy parameters in a database management system, by ad hoc queries or otherwise.

An even further prior art publication is featured in U.S. Pat. No. 5,982,890 [3] where a remote monitor computer connected to distributed computers detects fraudulent data update. "The monitor computer collects initial data of the databases of the distributed computers via the network to generate parities for data". Parities are later compared to detect an inconsistency.

There is disclosed a prior art solution in U.S. Pat. No. 5,758,150 for auditing of the databases, where a migratory application processes the audit trail files of the remote computer or database to create a database of change. According to the publication U.S. Pat. No. 5,758,150 the migratory application processes the audit until the database of change reaches a size of threshold, when the data extract and transfer application shuts down the migratory application, processes the database of change and restarts the migratory application to begin to creation of another database of change.

However, there are some disadvantages in the prior art methods for auditing of the databases in a trustworthy manner and securely. Most importantly, there is no automated method for securely auditing databases of distributed systems that would be able to audit a replica database with an unpredictable audit logic. An audit of the databases is performed in prior art by using separated audit application logic, whereupon there arises uncertainties about security and integrity of the system. In addition according to the prior art solutions the database server may prepare the desired results of the audit of the database beforehand taking advantage of the data or instruction for performing the audit situated in the database server and thus falsify the results of the audit of the database. Not only falsification, but the possibility of incompleteness in inspection are aspects of the prior art. When only data privacy parameters are enforced by inspecting them regularly it is still possible to corrupt the database by those parties that do not violate the data privacy. Parity inspection is a very limited method of inspection, and requires continuous surveillance in order to guarantee inspection reliability. A possibility exists that a corrupting action will change an even parity to an odd parity but then to an even parity again in between inspections.

Additionally, relying on the cryptography or other security mechanism alone to enforce data integrity is not always sufficient because any cryptography-based security system can be cracked if "unlimited" amount of computer processing power is applied or hacker finds a loophole from the security system.

SUMMARY OF THE INVENTION

The object of the invention is to increase the level of trust between master and replica databases by providing a method and an arrangement, which allows an efficient, easy, secure and reliable auditing process of the replica database. In addition the object of the invention is also to provide an unpredictable audit of the replica database managed by the master database for enhancing the security and trustworthiness of the overall system, where the replica database does not know when the system will be audited, what the audit will exactly do or what algorithms will be used to verify the systems integrity. Further the object of the invention is to ensure the authenticity of the audit results of the audited database.

The objects of the invention are fulfilled by using a master-initiated push synchronization method to force the replica database to perform an audit of the replica database contents, wherein the executed audit application is defined by the master database. The audit application is sent to the replica database by the master database, whereupon the replica database can execute the audit application in a certain moment, store the results of the audit and propagate the results to the master database for analysing and verifying process. In addition the objects of the invention are fulfilled by an unpredictable ad hoc algorithm as an audit application. Further the objects of the invention are achieved by encrypting the audit application and the results of the audit to be transferred between the master database and the replica database to be audited by public-key cryptography methods. In addition the objects of the invention are achieved by integrating the audit application process with the databases, whereupon the master database can manage the audit of the replica databases itself.

According to one embodiment of the present invention the master database may firstly determine a need or it may be instructed by an administrator to perform an audit on one or more replica databases. The need for an audit or "ad hoc audit" of the replica database may arise for example if, during data synchronization, a replica database attempts to execute a transaction in the master whose successful completion requires data validity check in the replica database. If the audit of the replica database is needed the master database preferably prepares expected results of the audit and stores them for later verification with actual results of the audit that is propagated from the replica database. However, it should be also noticed, that it is not even necessary to determine a need to perform an audit, but the audit may also be performed routinely.

After preparing process the master database pushes the "audit package" to the replica database using push synchronization mechanism. This audit package can be either an invocation of a program or procedure that already exists in the replica or it can be a new piece of program code that the replica needs to execute. Sending the new piece of program code happens using the regular synchronization functionality that is used between the master and replica database. To prevent tampering, the audit package can be signed prior to sending it to the replica.

Upon receiving the audit package, the replica database executes it either right away or upon instructions that are enclosed in the package or delivered by another way. The instructions can e.g. specify a date and time when the audit must be run on the replica database or alternatively an identifiable event that triggers the audit process. The audit process execution typically means running an application program that has been stored in the replica database or has been made otherwise available to the replica server. This program reads data from the database according to the logic of the program and produces a result set ("actual results") that are stored in the replica database in a secure manner (e.g. using Signed Transactions as described in U.S. patent application Ser. No. 09/846,107) for later propagation to the master database.

The actual results are sent to the master database by synchronizing the databases after which the master decrypts the result set and verifies its signature. If the signature is verified successfully, the actual results are stored in the master database and the actual results are verified against expected results by the master database. Any deviation between the actual and expected results is an indication of inconsistent or invalid data in the replica database.

If the audit does not pass, the master database administrator or application that operates on the master database can take any necessary action to regain trust. For example, it can exclude the failed replica database completely from the system, suspend all synchronization activities with the replica, conduct another audit or impose stricter limits to what the replica is allowed to do in the system.

The methods and arrangements in accordance with the invention are especially suited for auditing the systems that can produce significant financial transactions.

A method for establishing an audit to a database system comprising at least two databases is characterized in that,
  at least one first database, said first database being an auditing database, prepares and sends an audit request to at least one second database to be audited,
  at least one second database runs the said audit request,
  at least one second database sends the results of the said run to at least one first database,
  at least one first database verifies the said results.

An arrangement for establishing an audit to a database system comprising at least two databases is characterized in that,
  at least one first database, said first database being an auditing database, is arranged to prepare and send an audit request to at least one second database to be audited,
  at least one second database is arranged to run the said audit request,
  at least one second database is arranged to send the results of the said run to at least one first database,
  at least one first database is arranged to verify the said results.

A first database server comprising at least one master database and second database server comprising at least one replica database is characterized in that the first database server is arranged to send an audit request to at least one second database server.

A second database server comprising at least one replica database is characterized in that the replica database is arranged to receive an audit request and perform an audit of a second database according to the received request.

The best mode of the invention is considered to be a usage of a master-initiated push synchronization method to force the replica database to perform an audit of the replica database contents using an audit algorithm that is sent to the replica database right prior to performing the audit.

Some embodiments of the invention are described in the dependent claims.

BRIEF DESCRIPTION OF THE DRAWINGS

Next the invention will be described in greater detail with reference to exemplary embodiments in accordance with the accompanying drawings, in which.

DETAILED DESCRIPTION

Figure 1:
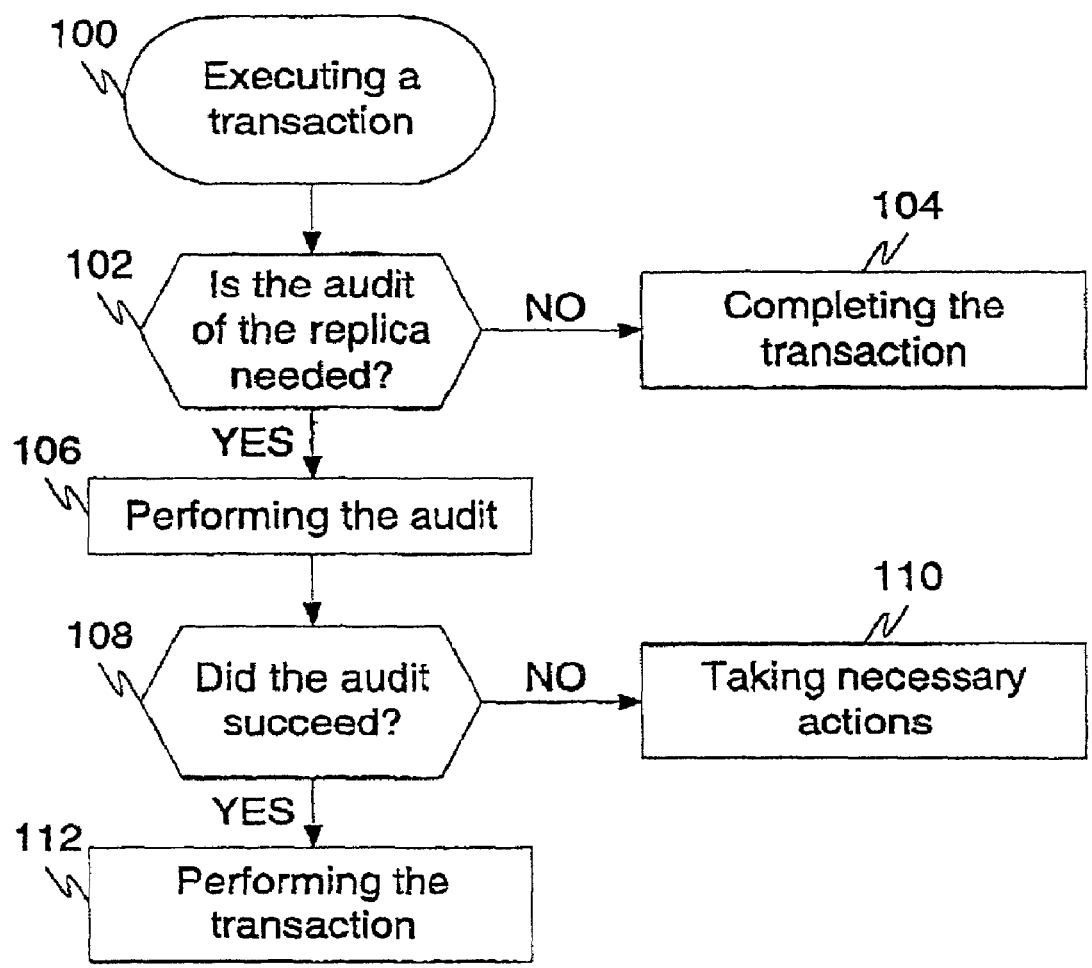
FIG. 1 illustrates a flow diagram of exemplary steps for executing a master initiated transaction according to the present invention

FIG. 1 illustrates a flow diagram of exemplary steps according to one embodiment of the present invention for execution 100 a transaction in the master, where the successful completion of the transactions requires data validity check in the replica database. The need for an audit of a replica database may arise for example in data synchronization process, where the replica database attempts to execute a transaction in the master. In step 102 the master may check, whether the audit of the replica database is needed for example by checking a monetary value of the transaction to be performed in the master. The audit of the replica database may be necessary for example if the monetary value of the transaction is greater than a predetermined value. If the audit of the replica database is not needed the transaction may be performed and completed in step 104. Otherwise the audit of the replica database is performed in step 106 like disclosed in this document, such as described for example in description of FIG. 3.

The master may for example send an audit application and request to perform the audit to the replica and prepare an expected result of the audit. The replica is audited in step 106 by the audit application performed in the replica, after which the result of the audit is propagated to the master for analysing process. In step 108 the master may verify the formerly prepared and stored results of the audit of the replica against the result sent by the replica. If the result of the audit sent by the replica agrees with the expected result the transaction may be performed in the master in step 112. If the audit does not pass, any necessary actions to regain trust can be taken in step 110 for example by the master database administrator or application that operates on the master database. The information flow between the master and the replica databases is typically delivered in secure manner.

Figure 2:
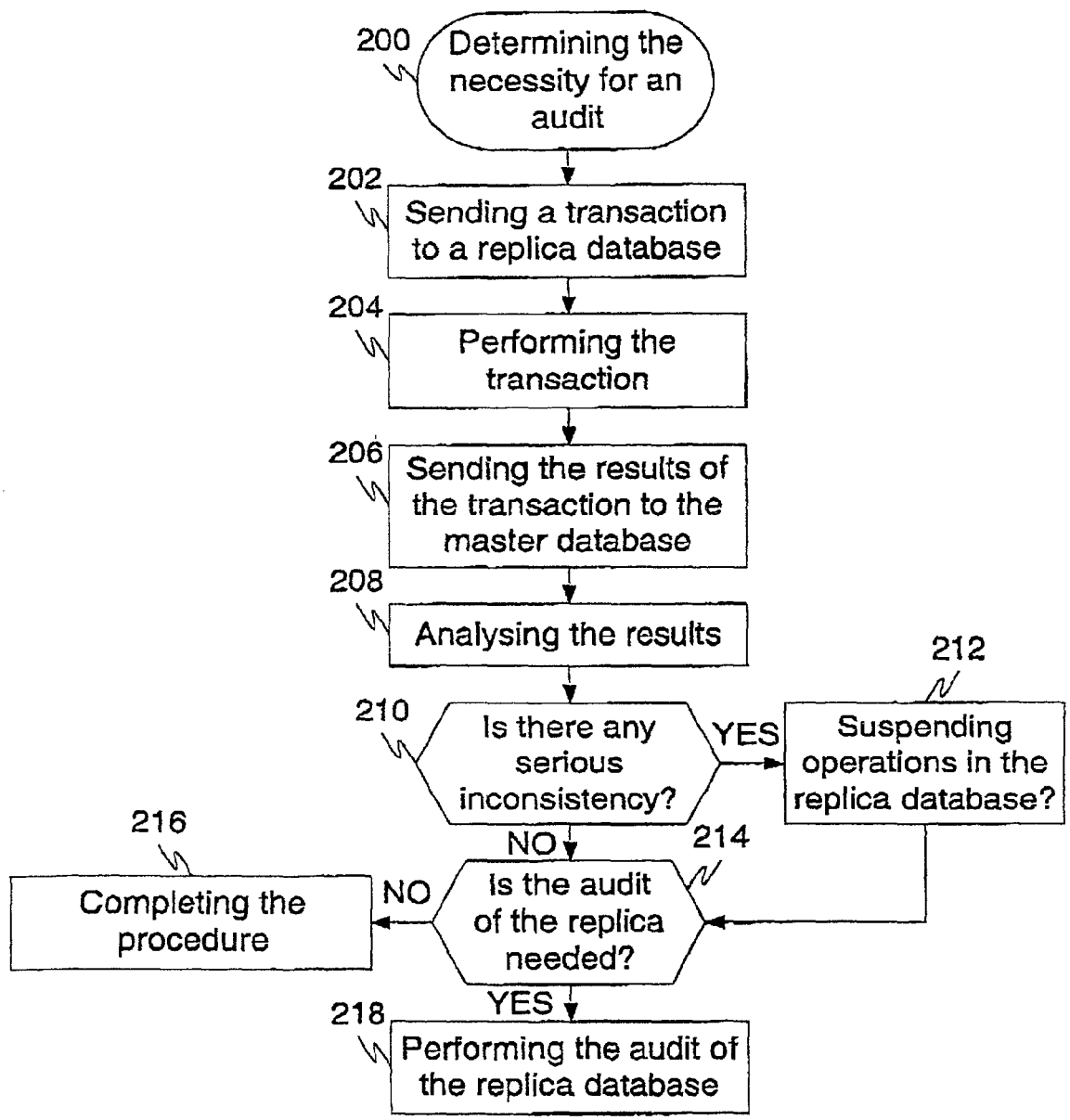
FIG. 2 illustrates a flow diagram of exemplary steps for determining the necessity for an audit according to one embodiment of the present invention.

FIG. 2 illustrates a flow diagram of exemplary steps of the method 200 for determining the necessity for an audit according to one exemplary embodiment of the present invention. The master database may in step 202 send a certain transaction, say preliminary observing transaction, to the replica database to determine the state of the replica database or the necessity for the audit. The master database may send the preliminary observing transaction to one or more replica databases at the same time. In addition the preliminary observing transaction may be sent to one replica database, after which the preliminary observing transaction may be propagated to another replica database on the network and so on until all the replica databases have been observed. The propagation of the preliminary observing transaction may also be suspended by the command sent by the master database or there can be also expiration time when the propagation will be suspended.

The preliminary observing transaction performed in step 204 may comprise a certain financial transaction, data acquisition algorithms or other tasks related to observing the status of the replica database or determining the necessity for an audit. The above tasks may for example collect information about the performed transactions or movement on the account or balance of the account or other data essential for the observing the necessity for an audit. The preliminary observing transaction may also only check when the replica database has been audited previously. The results of the performed preliminary observing transaction are sent to the master database in step 206 advantageously in encrypted form after which the master database may analyse the results in step 208. The results can be delivered from the replica database to the master database by synchronizing.

After analysing the results of the preliminary observing transaction performed on the replica database the master database may come to a conclusion whether the results of the preliminary observing transaction seem to be consistent or inconsistent with the expected results in step 210. The results may indicate for example that the information of the last audit will expire soon or is even expired, whereupon the audit of the replica database is needed. The results may also express a certain transaction performed by the replica database, which induces the necessity for an audit of the replica database.

If the results of the preliminary observing transaction are in balance with expected results the master database may decide in step 214 whether the audit of the replica database is needed or not. The audit may also be performed even if it is not deemed necessary. However, any deviation between the results of the preliminary observing transaction and expected results may be an indication of inconsistent data in the replica database. If there is any doubt of inconsistency due to the results of the preliminary observing transaction or the information of the last audit process has expired or otherwise the audit of the replica database is deemed necessary the master database can suspend executing all synchronization operations from the replica database(s) to be observed in step 212 and decide in step 214 whether the audit of the replica database is needed. However, suspending the execution of all synchronization operations in the replica database is optional.

The master database determines the necessity to perform the audit on one or more replica databases in step 214. Alternatively the master database may also be instructed by an administrator to perform the audit of one or more replica databases. The need for the audit or "ad hoc audit" of the replica database may arise for example if the replica database attempts to execute a transaction in the master database whose successful completion requires data validity check in the replica database as performed in FIG. 1. If the audit of at least one replica database seems to be necessary the audit may be performed in step 218. Otherwise the determining process will be suspended at least for a while in step 216.

It should be noticed that the order of the steps is not restricted exactly to the order illustrated in FIG. 2. In fact many permutations are in accordance with the invention. In addition the master database may also force the replica database to perform an audit without determining the necessity for the audit in advance. The master database may perform the determination of the necessity for an audit for example randomly, sequentially, at a certain time or when a certain limit of transactions is exceeded.

Figure 3:
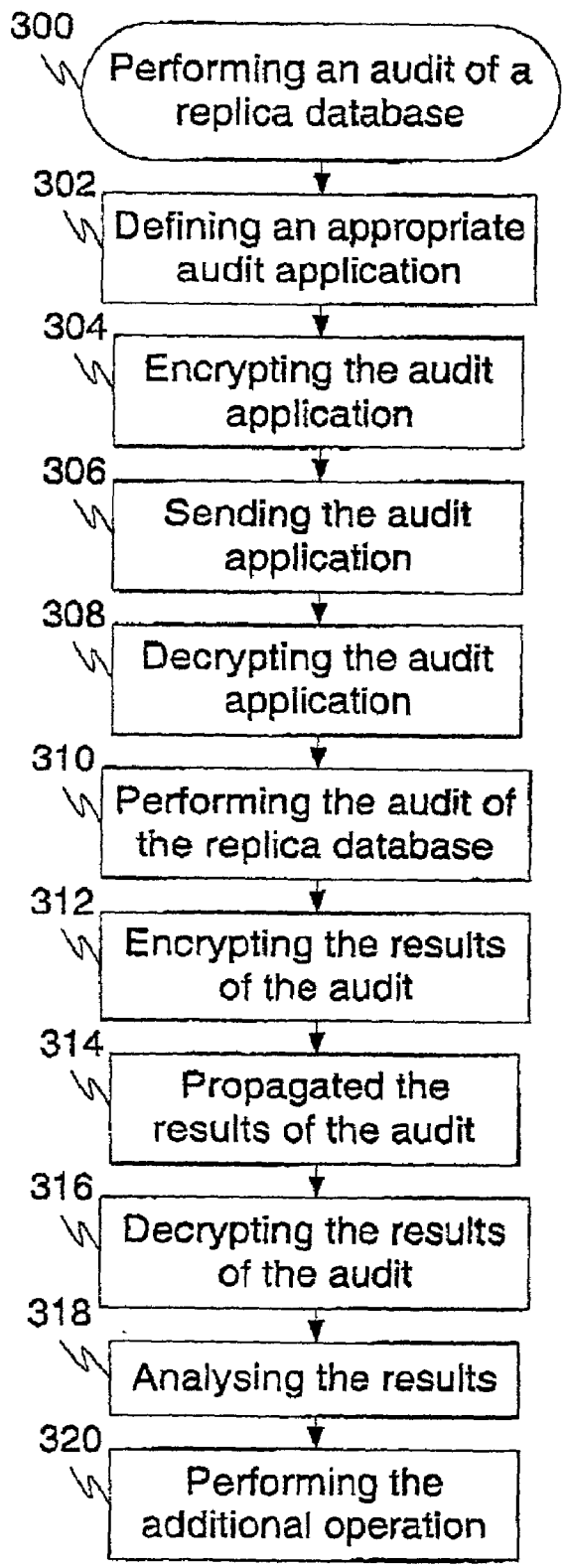
FIG. 3 illustrates a flow diagram of exemplary steps for performing an audit of a replica database according to the present invention.

FIG. 3 illustrates a flow diagram of exemplary steps of the method 300 for performing an audit of the replica database according to the present invention. The master database can perform an "unpredictable" audit of the replica database for example whenever deemed appropriate by the master database. This mechanism enhances the security and trustworthiness of the overall system by adding a fraud detection mechanism that detects invalid contents (i.e. unauthorized modifications) of the replica database. The invalid content of replica data is possible if the other security means such as encryption of local data of the replica database have been compromised and unauthorized access to database's data has become possible. If the replica database doesn't pass the audit, it can be blocked out of the system either temporarily or permanently, its access rights in the system can be restricted or the transactions coming from that database need a special (e.g. manual) approval mechanism.

The "unpredictable" audit to be performed in the replica databases means such an audit process, algorithm and/or audit application on a target in the replica, which are not known by the replica databases to be audited in advance. The replica database being audited should not know beforehand, when the audit process will be performed, what the audit will exactly do or what algorithms are used to verify the system integrity. The audit application may be for example encrypted and pushed to the replica database in advance, but the decrypting key and a command to execute the audit application may be delivered to the replica database later. In one embodiment of the invention the audit process could be like a conventional transaction in view of the replica database.

At first in step 302 the master database may define an appropriate audit application, which will be executed in at least one replica database. The master database may define only one common audit application or algorithm to be delivered for all the replica databases or alternatively the master database may also define individual and specific audit applications or algorithms for a certain or each of the replica database to be audited. The audit application package may comprise for example a certain algorithm or program to be executed. Alternatively the audit application can be either an invocation of a program or procedure that already exists in the replica database. The audit application can also be a new piece of program code that the replica database needs to execute. Sending the new piece of program code may happen using the regular synchronization functionality that is used between the master and replica database. In addition the audit application package may comprise instructions for the replica database, for example how and when to execute the audit application, to transfer the results to the master database, to propagate the audit application package to other replica databases or to sign and/or encrypt the results of the audit before sending them to the master database.

According to one exemplary embodiment of the invention the audit application package may comprise a third computer, preferably running a database server, where the actual executable audit application exists. In this embodiment the replica database downloads the audit applications from the third computer prior to the auditing. The results of the audit may be stored to this third database server where the master database may find the results and also be aware of the audited replica databases and still force the replica databases not yet audited to perform the audit process. Alternatively the results of the audit may also be stored to the replica database and synchronized to the master database.

However, despite the delivering method of the audit application the master database knows the audit application to be executed in the replica database to be audited, whereupon the master database may also prepare in step 302 expected results of the audit and stores them for later verification with actual results of the audit that is received from the replica database or via an Internet address. In addition the master database may know the date and time when the audit application will be executed in the replica database, whereupon the master can prepare the expected results at the right moment. The content of data of the master database has not to be necessarily identical with data of the replica database but the master database preferably should contain certain data identical with data of the replica database to be audited in order to prepare the sufficient expected results.

To prevent tampering and identifying the parties, the audit application package can be signed and encrypted in step 304 prior to sending it to the replica database(s). The used signing and/or encrypting method may be any kind of signing and encrypting method known by person skilled in the art, such as for example PGP (Pretty Good Privacy). In step 306 the master database pushes the audit package to the replica database preferably using push synchronization mechanism. In step 308 each of the replica database to be audited receives the audit application package, decrypts it and verifies the signature. In addition the replica database may also verify the master database in step 308. However, according to the invention the audit application or algorithm to be executed in the replica database to be audited is not disclosed to the replica database in advance. According to the one embodiment of the invention the execution of the audit application can be triggered by a command that may be delivered as a revelation to the replica database.

Upon receiving the audit package the replica database to be audited may perform the audit process in step 310 immediately. Alternatively according to the one exemplary embodiment of the present invention the audit process may be performed also at a later time. The instruction delivered with the audit application package or separately can specify for example a date and time when the audit must be executed or alternatively an identifiable event that triggers the audit process. The identifiable event may be for example a certain transaction, a certain limit of transactions or a certain user. The audit process of the replica database can be triggered also using a RPC (Remote Procedure Call). In addition a certain command delivered through a used information network may trigger the audit process of at least one replica database. The RPC and the command may be delivered for example by the master database or the administrator.

The audit process execution typically means running an application program that has been stored in the replica database or has been made otherwise available to the replica server. This program reads data from the database according to the logic of the program and produces a result set ("actual results") that are stored in the replica database. The results of the audit are typically encrypted in step 312 in a secure manner prior to storing and later propagation to the master database. The results of the audit may be also signed in step 312. In some special embodiments Signed Transactions are used as described in U.S. patent application Ser. No. 09/846, 107 "Method and arrangement of secure synchronized transactions" by the applicant.

The actual results are propagated to the master database in step 314 either directly or via the third computer. The results are advantageously delivered to the master database by synchronizing the databases. The master database decrypts the results and verifies its signature in step 316. If the decrypting and verifying are successful, the actual results are stored in the master database. Otherwise the operations in the replica database may for example be suspended. In step 318 the master database verifies the actual results against expected results. Any deviation between the actual and expected results is an indication of inconsistent data in the replica database. If the audit does not pass, the master database administrator or application that operates on the master database can perform additional operations or take any necessary action to regain trust in step 320. For example, the master database can exclude the replica database completely from the system, suspend all synchronization activities with the replica database, conduct another audit or impose stricter limits to what the replica database is allowed to do in the system. Alternatively the master database may also be instructed by an administrator to suspend the operations in the replica database.

Figure 4:
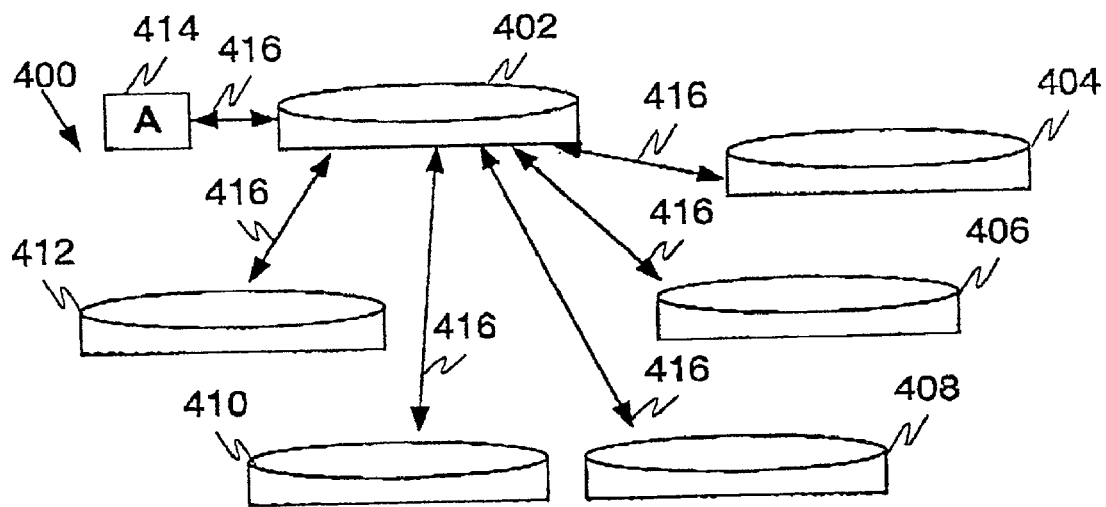
FIG. 4 illustrates a block diagram of an exemplary arrangement for auditing the replica database according to the present invention.

FIG. 4 illustrates a block diagram of an exemplary arrangement 400 for auditing the replica databases according to one embodiment of the present invention. At first the master database 402 may generate at least one audit application and store it to the memory means of the master. The master database 402 may also determine the necessity for an audit of the replica databases 404, 406, 408, 410, 412 for example by sending a preliminary observing transaction or the like to the replica databases or the master database 402 may be instructed for example by an administrator 414 to perform the audit on one or more replica databases. The master database 402 is connected to the replica databases 404, 406, 408, 410, 412 by an information network 416. The master and replica databases may locate in the same server or terminal with each other or alternatively in different servers or terminals.

In addition the master database 402 may also prepare expected results of the audit process for each replica database to be audited and store the results in memory means for later analysing. When the audit process deemed necessary, the master database 402 may force the replica databases to perform the audit process. The master database 402 may force all the replica databases of the network to perform the audit process for example at the same time or when a certain event or transaction occurs or according to the instructions delivered with the audit application. The audit process may be also triggered for example by a remote procedure call (RPC). In addition only the selected replica databases may be forced to perform the audit process.

When the audit process deemed necessary, the master database 402 may push the predefined executable audit application to the replica databases 404, 406, 408, 410, 412 to be audited advantageously using a push synchronization mechanism. Alternatively at least one executable audit application may have been delivered to the replica databases 404, 406, 408, 410, 412 beforehand, whereupon the master database 402 can also send only a command to the desired replica databases in order to execute a certain predefined audit application that already exist in the replica databases. In addition the master database 402 may also generate an ad hoc algorithm that is sent to at least one replica database 404, 406, 408, 410, 412 right prior to performing the audit.

According to the embodiment illustrated in FIG. 4 the master database 402 may manage the audit process of the replica databases 404, 406, 408, 410, 412 also individually. In this embodiment the master database 402 may at first determine the necessity for an audit of each replica database independently and define or generate an individual audit application for each replica databases 404, 406, 408, 410, 412 to be audited. The master database may also force only one or few replica databases to perform an audit process for example in a situation where there is no need to perform the audit process for all replica databases.

In addition according to the embodiment illustrated in FIG. 4 the audit application or algorithm may be pushed to the replica databases 404, 406, 408, 410, 412 by the master database 402 independently and the audit application or algorithm may be provided for example by information concerning the date and time or transaction or other event when the audit process will be performed. Now each replica database may independently perform the audit process and synchronize the results of the audit to the master database 402. Also now the delivered information between the master database 402 and the replica databases 404, 406, 408, 410, 412 may be secured individually and more reliably, whereupon the security level is much higher than in a situation where the same audit application is pushed to the numerous replica databases at the same time.

Figure 5:
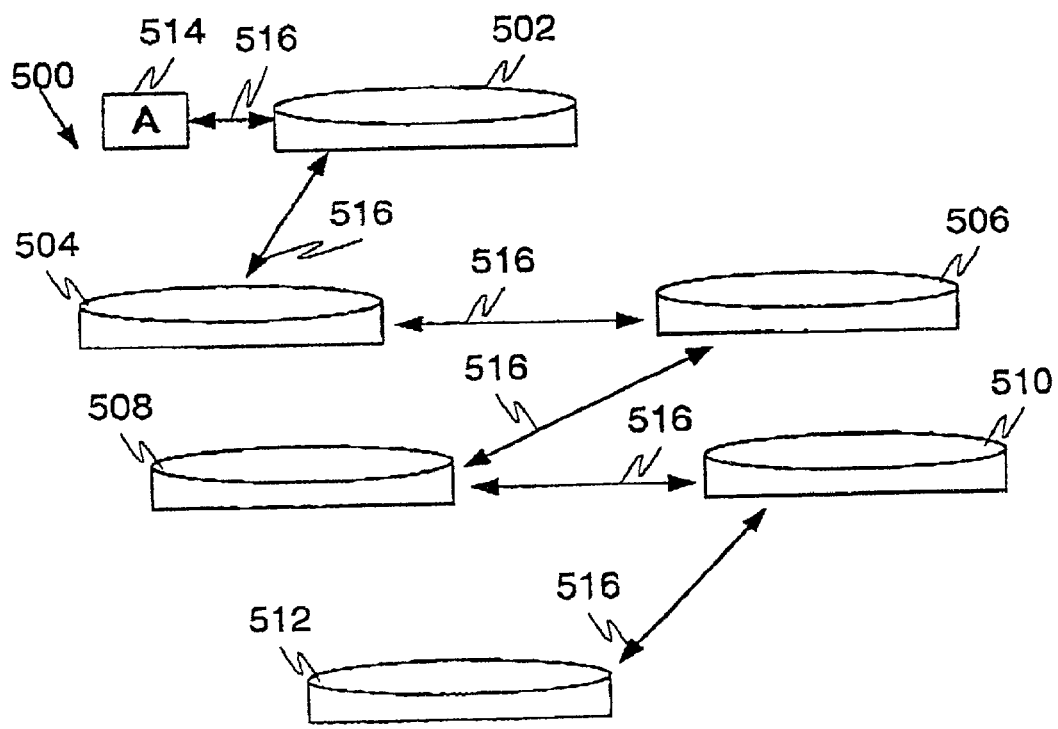
FIG. 5 illustrates a block diagram of another exemplary arrangement for auditing the replica database according to the present invention.

FIG. 5 illustrates a block diagram of another exemplary arrangement 500 for auditing the replica database according to one embodiment of the present invention. At first the master database 502 may determine the necessity for an audit of the replica databases 504, 506, 508, 510, 512 or the master database 502 may be also instructed for example by an administrator 514 to perform the audit on one or more replica databases.

In the embodiment performed in FIG. 5 the master database 502 defines and generates at least one audit application package or ad hoc algorithm and pushes it to the first replica database 504. The audit application package, which may be encrypted in a secure way, comprises an executable audit application and may also comprise instructions for the replica database to perform the audit or execute the application. Now the replica database 504 may store the audit application package and optionally execute the audit application or ad hoc algorithm and synchronize the results of the audit process to the master database 502 after which the replica database 504 may propagate the audit application package or ad hoc algorithm to the next replica database 506. Alternatively the replica database 504 may also store the audit application package and propagate it to the next replica database 506 and execute the stored audit application later, such as for example when a certain command will be received from the master database.

In addition according to the one embodiment of the invention the first replica database 504 may also execute the audit application, store the results of the audit to the audit application package and propagate the audit application package to the next replica database 506, where the propagated audit application package is updated by the results of the audit of the first replica database 504. The second replica database 506 may also perform the audit of the contents of the second replica database 506 in similar way than the first replica database 504 and again update the audit application package with the results of the audit of the second replica database 506 and further propagate the updated audit application package to the next replica database 508. The results of each replica database may be encrypted by the corresponding replica database before propagating the updated audit application package to next replica databases.

The propagation process of the audit application package may be continued until the last defined replica database or last replica database of the information network 516 has been audited, after which the audit application package updated by the results of each audited replica databases is propagated back to the master database 502. The propagation process between the replica databases can be suspended for example by sending a certain command by the master or by using an expiration time limit in the audit application package.

The audit application will propagate from the first replica database 504 through the whole information network and the audit application will be advantageously executed in all replica databases 506, 508, 510, 512. The replica databases 504, 506, 508, 510, 512 can synchronize the results to the master database 502 either via previous replica databases or directly. The embodiment of the invention illustrated in FIG. 5 is advantageous for example in a conventional situation where all the replica databases are audited routinely and when there is no need to audit any replica database independently.

Figure 6:
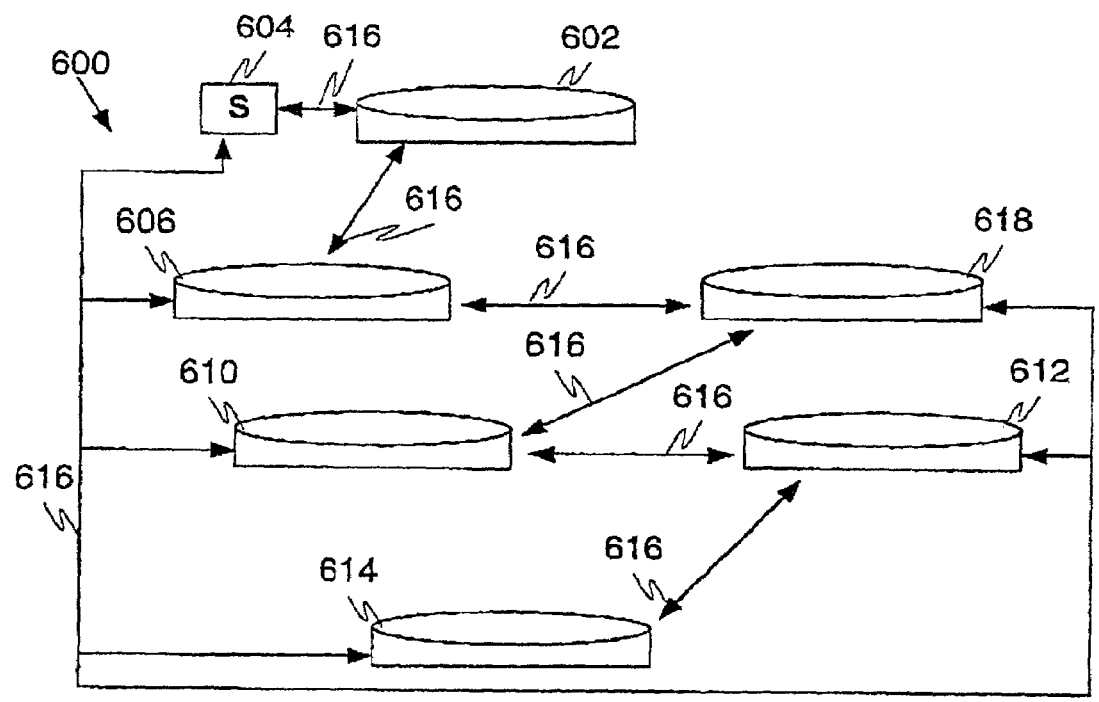
FIG. 6 illustrates a block diagram of another exemplary arrangement for auditing the replica database according to the present invention.

FIG. 6 illustrates a block diagram of another exemplary arrangement 600 for auditing the replica database according to one embodiment of the present invention, where the master database 602 defines and generates at least one audit application and delivers it to at least one replica database to be audited. The master database 602 may push at least one executable audit application or ad hoc algorithm to a database server 604, where each of the replica databases 606, 608, 610, 612, 614 can download the executable audit application or ad hoc algorithm addressed by the master database 602. The used information network 616 may be any kind of information network known by a person skilled in the art.

The master database 602 may again determine the necessity for an audit of the replica databases 606, 608, 610, 612, 614 in a similar way than described earlier in this document. According to the embodiment illustrated in the FIG. 6 the master database 602 may deliver an address to the replica databases where to download appropriate audit application, algorithm and/or optional instructions to perform the audit process. Instructions may comprise for example a certain date and time to perform the audit of the replica database contents or encrypting key to use for encrypting the results to be synchronized from the replica database to the master database. Further there may be an individual audit application for each replica database or alternatively a common audit application for all replica databases at the server 604. In addition the delivered audit application may be encrypted in a secure manner, whereupon the replica databases knows the decrypting key beforehand or it may be delivered to the replica databases by the master database 602 afterward. However, the decrypting key must be delivered to the replica database before performing the audit process.

After the downloading and decrypting the appropriate audit application or algorithm the replica database may perform it immediately or later, for example at a certain date and time or when a certain transaction occurs or when a certain limit of transactions exceeds. The audit process can also be triggered using for example a remote procedure call (RPC) or other separate command. When the audit process of the replica database contents has been completed the results may be encrypted and signed and delivered to the master database 602 for example by synchronizing the databases. According to the one embodiment of the invention the results of the audit may also be sent and stored to the database at the server 604, where the master database can find them.

The method and arrangement for delivering, propagating and synchronizing a determining query for necessity for an audit, audit applications, ad hoc algorithms, instructional information, commands, results of the audit and other information concerning the audit process of at least one replica database according to the present invention can be arranged with any kind of information network 416, 516, 616 suitable for data transfer or with any kind of data management devices known by a person skilled in the art. One said exemplary method and arrangement is already depicted in a previous U.S. patent application Ser. No. 09/851,478 [2] of the same applicant. The used information network can be for example wired or wireless information network and it can be implemented to work in a telecommunication system, which is compliant with at least one of the following: TCP/IP, CDMA, GSM, HSCSD, GPRS, WCDMA, EDGE, Bluetooth, UMTS, Teldesic, Iridium, Inmarsat, WLAN, DIGITV, and imode.

It is also preferable to use a standardized operating system in the devices, such as those servers and devices, which administer the master and replica databases in the information network. The operating system of devices may be, for example, Unix, MS-Windows, EPOC, NT, MSCE, Linux, VxWorks, ChorusOS, PalmOS, Elate, NetBSD, FreeBSD, OSE and GEOS.

Each of the replica databases in the arrangements 400, 500, 600 can be implemented by servers and terminals, which are to be arranged to receive preliminary observing transactions, audit applications, ad hoc algorithms and/or commands or codes delivered or pushed by the master database. In addition the replica database servers or terminals are to be arranged to decrypt and verify the received audit application or the like, execute them, produce the results and encrypt and store the results of the audit. Further the replica database servers or terminals are to be arranged to propagate the audit application to another replica databases or replica database servers or terminals when necessary and deliver the results to the master database for example by a synchronizing mechanism.

The master databases in the arrangements 400, 500, 600 can be implemented by servers and terminals, which are to be arranged to define and generate preliminary observing transactions, audit applications, ad hoc algorithms and/or commands or codes and also encrypt, sign and deliver them to at least one replica database and/or at least one server for example by using a synchronization mechanism. In addition the master database servers or terminals are to be arranged to determine the necessity for an audit of the replica databases, force the replica databases to perform an audit process and to receive and decrypt the encrypted results from the replica databases or the other server. Further the master database servers or terminals are to be arranged to exclude replica databases completely from the system, suspend all synchronization activities with the replicas, conduct another audit or impose stricter limits to what the replica is allowed to do in the system.

Several advantages of the inventive method and system have been demonstrated and it is clear that it realises several application opportunities in accordance with the invention. For example the master and replica databases according to the present invention can be managed by any data processing device known by a person skilled in the art, such as for example a computer, a workstation or a mobile station equipped with a suitable means for connecting to the information network. In addition the device may comprise at least one processor and memory means.

A system according to the invention can be implemented by a person skilled in the art with state of the art information technology and communication technology components. A person skilled in the art can implement the functions according to the invention by arranging and programming such components to realize the inventive functions.

To a person skilled in the art it is obvious that in order to have an illustrative description the above presented exemplary embodiments have a structure and a function, which are relatively simple. By applying the model presented in this application it is possible to design different and very complicated systems, which in obvious ways to the expert, utilise the inventive idea presented in this application.

For example the invention does not restrict the number of the replica databases to be audited or the number of the master databases, which manage the audit of the replica databases. The present invention may be considered to relate all systems that can produce significant financial transactions and may be considered to be subject to audits. Therefore the mechanism disclosed in this document is an essential building block for distributed systems that deal with money and especially a building block for building a "smart money" infrastructure. Especially the present invention can be applied in cash machines that operate on local copy of financial data instead of data of a central database.

The invention has been explained above with reference to the aforementioned embodiments, and several advantages of the invention have been demonstrated. It is clear that the invention is not only restricted to these embodiments, but comprises all possible embodiments within the spirit and scope of the inventive thought and the following patent claims.

[1] EP 0 860 788; Intelligent Transaction, Solid Information Technology Oy
[2] U.S. patent application Ser. No. 09/851,478; Method and Arrangement for the Management of Database Schemas, Solid Information Technology Oy
[3] U.S. Pat. No. 5,982,890: Method and system for detecting fraudulent data update
[4] U.S. Pat. No. 6,275,824: System and method for managing data privacy in a database management system

The invention claimed is:

1. A method for establishing an audit of a database system comprising at least one first database and at least one second database, comprising the steps of:
    at least one first database, said first database being an auditing database sending an audit request to at least one second database to force said at least one second database to perform an audit of contents of said at least one second database, said second database being a to be audited database,
    based on contents of said first database, said first database preparing an expected results of the audit of the contents of said at least one second database,
    said at least one second database executing at least one audit procedure based on data of said audit request,
    said execution of said audit procedure producing, based on the contents of said at least one second database, a set of data items as a result data of said execution,
    said at least one second database sending said result data of said execution to said at least one first database, and
    said at least one first database verifying said result data by comparing said result data with data from said expected results prepared by said first database, wherein,
    said audit request comprises at least one of i) one data item and ii) a computer executable instruction.

2. A method according to claim 1, characterized in that instructions of the audit are unavailable to the second database to be audited before the sending of the audit request.

3. A method according to claim 1, characterized in that said audit request comprises at least one computer executable instruction for at least one of the following: what the audit will exactly do, what algorithms are used and when the audit will be performed.

4. A method according to claim 1, characterized in that at least one of the following audit procedure is delivered to at least one second database to be audited prior the auditing: an audit application, an algorithm and a program code to be executed in the database.

5. A method according to claim 4, characterized in that said audit procedure is defined and/or generated on at least one of the first database.

6. A method according to claim 4, characterized in that said audit procedure depends at least partly on the state of at least one second database to be audited.

7. A method according to claim 4, characterized in that said audit procedure is pushed from the first database to at least one second database using synchronization that is initiated by the first database.

8. A method according to claim 4, characterized in that said audit procedure is downloaded from a third computer to at least one second database to be audited.

9. A method according to claim 1, characterized in that the necessity for an audit of at least one second database to be audited is determined before the audit by at least one first database.

10. A method according to claim 1, characterized in that said audit request comprises at least one of the following information: encrypting key, decrypting key, information about when and how to perform the audit and when and how to generate, encrypt and synchronize the result and information about an event that triggers the audit.

11. A method according to claim 1, characterized in that the audit process of at least one second database is triggered by at least one of the following events: date, time, time limit, a certain transaction, a certain user, a certain limit of the performed transactions, a command delivered by at least one of the first database, a command delivered by an administrator and remote procedure call (RPC).

12. A method according to claim 1, characterized in that at least one second database to be audited synchronize the results of the audit to at least one of the following: to at least one first database, to a public server and/or to at least one other second database.

13. A method according to claim 1, characterized in that at least one second database to be audited stores the results of the audit.

14. A method according to claim 1, characterized in that at least one first database prepares expected results of the audit of the audited database and stores the expected results for later verification.

15. A method according to claim 1, characterized in that at least one of the following is delivered between the databases in an encrypted form: said audit request, an algorithm, a program code, instructions and results of the audit.

16. A method according to claim 1, characterized in that at least one of following performances is applied on the database if the audit of said database does not pass: excluding said database completely from the system, suspending all synchronization activities with said database, conducting another audit for said database and imposing stricter limits to what said database is allowed to do in the system.

17. An arrangement for establishing an audit to a database system comprising at least one first and at least one second databases, the arrangement comprising:
at least one first database, said first database being an auditing database, arranged to send an audit request to at least one second database to force said at least one second database to perform an audit of contents of said at least one second database,
based on contents of said first database, said first database preparing an expected results of the audit of the contents of said at least one second database,
said at least one second database arranged to execute at least one audit procedure based on data of said audit request, and arranged so that the execution of said audit procedure produces, based on the contents of said at least one second database, a set of data items as a result data of said execution,
said at least one second database arranged to send said result data of the execution to said at least one first database,
said at least one first database arranged to verify said result data by comparing said result data with data from said expected results prepared by said first database, wherein,
said audit request comprises at least one of i) one data item and ii) a computer executable instruction.

18. An arrangement according to claim 17, characterized in that the arrangement comprises means for storing instructions of the audit unavailably to the second database to be audited before the sending of the audit request.

19. An arrangement according to claim 17, characterized in that the arrangement comprises means for delivering at least one of the following audit procedure from at least one of the first database to at least one of the second databases: an audit application, an algorithm and a program code to be executed in the database.

20. An arrangement according to claim 17, characterized in that the arrangement comprises means for defining and/or generating the audit procedure on at least one first database.

21. An arrangement according to claim 17, characterized in that the arrangement comprises means for pushing said audit procedure from the first database to at least one second database using synchronization that is initiated by the first database.

22. An arrangement according to claim 17, characterized in that the arrangement comprises means for determining the necessity of an audit for at least one second database before the audit.

23. An arrangement according to claim 17, characterized in that the arrangement comprises means for delivering the instructions for an audit performance to at least one second database to be audited.

24. An arrangement according to claim 17, characterized in that the arrangement comprises means for synchronizing the results of the audit of at least one second audited database to at least one of the following: to at least one first database, to the public server and to at least one another second databases.

25. An arrangement according to claim 17, characterized in that the arrangement comprises means for storing the actual results of the audit, means for preparing the expected results of the audit of the database to be audited and means for verifying the actual results against the expected results.

26. An arrangement according to claim 17, characterized in that the arrangement comprises means for triggering said audit process on at least one of the second database by at least one of the following event: time limit, a certain transaction, a certain user, a certain limit of the performed transactions, a command delivered by at least one of the first database, a command delivered by an administrator and remote procedure call (RPC).

27. An arrangement according to claim 17, characterized in that the arrangement comprises means for encrypting and decrypting at least one of the following information delivered between the databases: said audit request, an algorithm, a program code, instructions and results of the audit.

28. An arrangement according to claim 17, characterized in that the arrangement comprises means for applying at least one of following performance on the database if the audit of said database does not pass: excluding said database completely from the system, suspending all synchronization activities with said database, conducting another audit for said database and imposing stricter limits to what said database is allowed to do in the system.

29. An arrangement according to claim 17, characterized in that the database servers are provided in a terminal, which is at least one of the following: a mobile station, a computer, a workstation and personal digital assistant.

30. The method of claim 1, wherein,
in said step of said first database preparing an expected results of the audit of the contents of said at least one second database, said first database stores the expected results for later verification with said result data from said second database, and
in said step of said first database comparing said result data with data from said expected results prepared by said first database, said first database compares said result data with data from said stored expected results.

31. The arrangement of claim 17, wherein,
in said step of said first database preparing an expected results of the audit of the contents of said at least one second database, said first database stores the expected results for later verification with said result data from said second database, and
in said step of said first database comparing said result data with data from said expected results prepared by said first database, said first database compares said result data with data from said stored expected results.

32. The method of claim 30, wherein,
said second database comprises at least a partial copy of data of said first database, said partial copy of data being at least partially maintained using data synchronization.

33. The arrangement of claim 31, wherein,
said second database comprises at least a partial copy of data of said first database, said partial copy of data being at least partially maintained using data synchronization.

34. The method of claim 1, wherein,
said second database comprises at least a partial copy of data of said first database, said partial copy of data being at least partially maintained using data synchronization.

35. The arrangement of claim 17, wherein,
said second database comprises at least a partial copy of data of said first database, said partial copy of data being at least partially maintained using data synchronization.

* * * * *